United States Patent [19]

Fries et al.

[11] Patent Number: 4,921,382
[45] Date of Patent: May 1, 1990

[54] SCREW LOCK

[76] Inventors: Bror Fries; Berit Fries, both of Linghult 2, S-310 21 Hishult, Sweden

[21] Appl. No.: 173,607
[22] Filed: Mar. 25, 1988

[30] Foreign Application Priority Data

Apr. 29, 1987 [SE] Sweden ................................ 8701781

[51] Int. Cl.⁵ .............................................. F16B 13/06
[52] U.S. Cl. ........................................ 411/45; 49/505; 52/126.4; 52/217; 411/58; 411/72; 411/107; 411/337; 411/510
[58] Field of Search ....................... 411/44, 45, 48, 57, 411/60, 103, 107, 178, 383, 396, 533, 911, 337, 508–510, 58, 71, 72; 49/468, 505; 52/126.4, 217

[56] References Cited

U.S. PATENT DOCUMENTS

| 623,809 | 4/1899 | McCreery | 411/60 |
|---|---|---|---|
| 2,455,885 | 12/1948 | Theurer | 411/57 |
| 3,316,953 | 5/1967 | Fransson et al. | 411/108 |
| 3,481,242 | 12/1969 | Topf | 411/510 X |
| 3,667,338 | 6/1972 | Johansson | 411/427 X |
| 4,114,509 | 9/1978 | Poe | 411/60 |
| 4,259,890 | 4/1981 | Walsh | 411/55 X |
| 4,486,134 | 12/1984 | White | 411/103 |
| 4,655,656 | 4/1987 | Jönsson | 411/337 |
| 4,729,606 | 3/1988 | Narita et al. | 411/60 X |
| 4,760,495 | 7/1988 | Till | 411/55 X |

FOREIGN PATENT DOCUMENTS

| 2242982 | 5/1959 | Fed. Rep. of Germany | 411/60 |
|---|---|---|---|
| 1179556 | 3/1974 | France | |
| 111311 | 8/1967 | Norway | 411/58 |

Primary Examiner—Lloyd A. Gall
Attorney, Agent, or Firm—Burns, Doane, Swecker & Mathis

[57] ABSTRACT

A locking apparatus intended to be anchored in the bore of an element and to receive rotatably by snap-in closure a mating element provided with an undercut head. The locking apparatus according to the invention includes a substantially cylindrical body having first and second ends. Outwardly directed gripping means are arranged in the peripheral surface of the body at its first end. The body has a coaxially arranged cavity which narrows toward an opening in the first end. The cavity extends to the second end of the body and the body is provided there with an inwardly directed flange. The body is expansible or flexible at the first end.

13 Claims, 3 Drawing Sheets

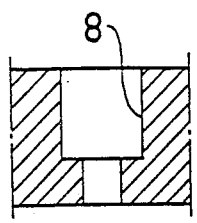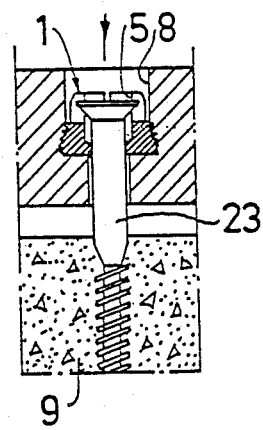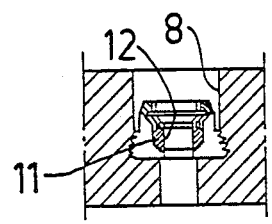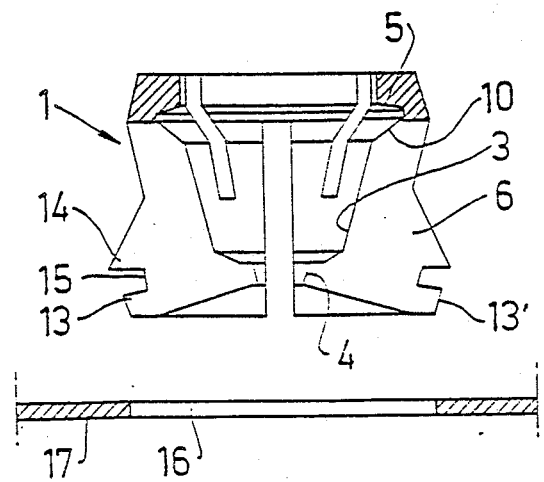

SCREW LOCK

FIELD OF THE INVENTION

This invention relates to a lock for securing a screw or the like in an anchored position.

BACKGROUND OF THE INVENTION

In many cases, for instance when mounting door-frames and window-frames, it is desirable, even necessary, to be able to adjust the frame in relation to the wall which usually is not level and is often times vertical. Various methods for mounting door-frames exist, the most usual one using screws or nails as well as wedges. In this case, it is very difficult to adjust the door-frame afterwards. In order to simplify after-adjustment, different forms of sleeves with fixed or loose screws are used when mounting the door frame. Specially made adjusting screws are also employed.

Common to known mounting methods is that they require special measures in addition to preboring and counterboring for the mounting screw. In certain cases special screws are required.

A solution of the problem is discussed in Swedish Patent No. 8402786-1 showing a screw lock which is screwed home in the usual manner together with the screw after the required and stanardized preboring with countersinking. No special tools or special measures other than the application of the screw lock onto the screw are required. However, it has been found that this screw lock requires a large investment in machines for manufacture due to its relatively complicated form and due to the fact that it must be made of metal, and therefore the price per unit will be relatively large. Moreover, this screw lock can only be used in countersunk boreholes, especially in wood and particle board.

OBJECTS AND SUMMARY OF THE INVENTION

The present invention enables the use of cheap material such as plastic for manufacture of the locking means and the invention can also be used with small changes together with profiles of plate or PVC. Nor is the locking means according to the invention restricted for use only together with screws but can also be used in the attachment of for example pins provided with heads coacting with similar locking means fixed in other structural elements which is useful, for example, when mounting furniture. This is possible thanks to the fact that the invention has been given the characteristic features defined in the claims.

BRIEF DESCRIPTION OF THE DRAWING

The invention will be described in greater detail in the form of a number of examples with reference to the drawing, wherein:

FIGS. 4 and 5 are schematic views of a prebored hole in a building element as well as the mounting and fixing of the locking means therein;

FIG. 6 is a schematic view of another mounting possibility in this hole;

FIG. 7 is a sectional view of another embodiment of the invention intended for fixing in a plate or PVC-profile;

DETAILED DESCRIPTION OF A PREFERRED EMBODIMENT

Figure 3:
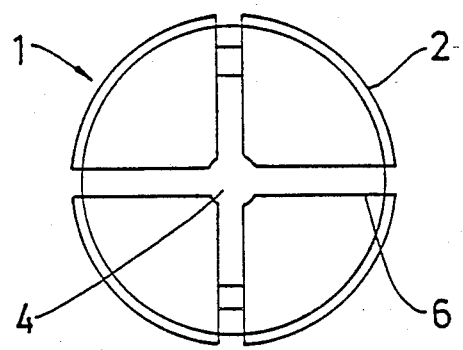
FIG. 3 is a bottom view of the invention.
Figure 1:
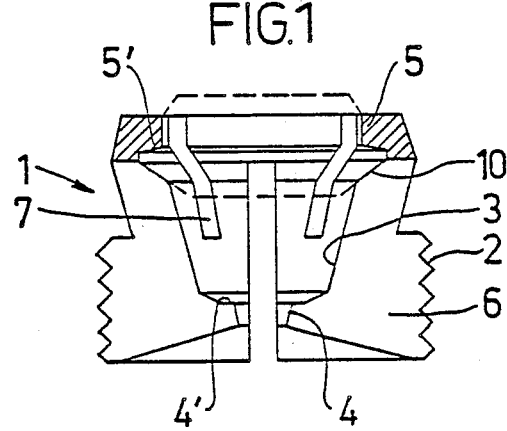
FIG. 1 is a lateral section view of a locking means in accordance with the invention.
Figure 2:
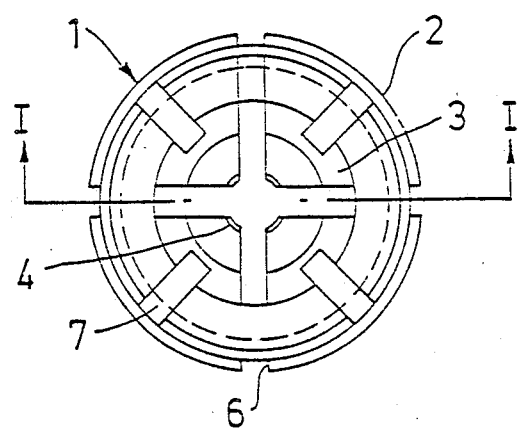
FIG. 2 is a top plan view of the invention.

The locking apparatus according to the invention consists of a substantially cylindrical body 1 having outwardly directed gripping means at a first end which according to FIG. 1 are made of a number of peripheral, outwardly directed ridges 2 formed with pointed tops. The body 1 is further provided with a cavity 3 extending coaxially through the body. This cavity is tapered toward a first end of hte body which presents the gripping means 2 and extends to an opening 4 at this end. An inwardly directed shoulder 4' connects the cavity 3 to the opening 4 The cavity 3 includes a flange 5 at the other end of the body. In order to be able to expand elastically, which will be described later, the body is further provided with a number of axial, first slits 6 which are open at the first end and the bottoms of which are spaced from the other end of the body. Moreover, coaxial second slits 7 are arranged which end in the other end of the body and the bottoms of which are spaced from the first end of the body.

In order to make it easier to understand the invention, examples of the mounting and use of the invention are described in connection with FIGS. 4-6. Thus, FIG. 4 shows a hole 8 prebored in a building element and provided with a shoulder. The body 1 of the invention is brought down in order to reach the bottom of the shoulder of the hole 8. For instance a wooden screw 23 is thereafter brought through the cavity of the body and, due to the fact that the diameter of the screw is larger than the opening 4 of the cavity 3, it will force the inner portion with the gripping means 2 outwards pressing in gripping means into the material surrounding the hole 8. The screw is forced so far down into the body 1 that the flanges 5 flip over the upper side of the screw head. This is possible as the conical inside of the screw head will first press apart the flanges. Thus, in the position shown in FIG. 5 the flanges will have the effect that if the screw is for instance screwed out of a second building element 9, the element with the hole 8 will be moved together with the screw head. Since the cavity 3 is undercut at 10 immediately inside the flange 5, as is apparent from for instance FIG. 1, the element with the hole 8 will also accompany the inward motion of the screw head when the screw is screwed into the second element 9. According to FIG. 6 the body 1 has been introduced into the hole 8 and a cylindrical element 11 having a central hole 12 which is somewhat greater than the diameter of the screw 23 has thereafter been pressed into the cavity of the body. When the cylindrical element 11 reaches the bottom of the cavity 3 it has also pressed out the gripping means 2 in the material surrounding the hole 8. Thus, using the cylindrical element or the ring it is possible to fix the body 1 in advance in the prebored hole 8. This may be suitable in prefabrication of various structural elements such as furniture components. It is to be understood that the cylindrical element 11 has obliquely beveled end surfaces and is introduced into the wider opening of the cavity 3.

FIG. 7 shows a body 1 in accordance with the invention which corresponds substantially with the body described exept that the gripping means have been given another form. Thus, the first end of the body 1 is provided with a first flange 13 and a second flange 14 which form between themselves a recess 15 extending around the body. The first flange 13 connects in a tapering way to the first end of the body 1 in the form of a guide surface 13' and the second flange 14 has a larger diameter than the flange 13. In this case the body 1 is put in a hole or opening 16 of a profile 17 (only a portion is shown) in such a way that the flange 13 is brought down through the hole 16, the axial position of the body 1 automatically being reached when the flange 14 prevents further motion of the body. By introducing a screw into the cavity 3 of the body 1 or a cylindrical element or ring 11 (not shown), as previously described, the gripping means are forced away from each other, i.e. the first and the second flange engage the profile 17 and will consequently lock the body 1 to this.

By forming the inside 5' of the flange 5 somewhat conical or inclined inwards and towards the second end of the body 1 the engagement of the screw head can be made entirely without play.

Figure 8:
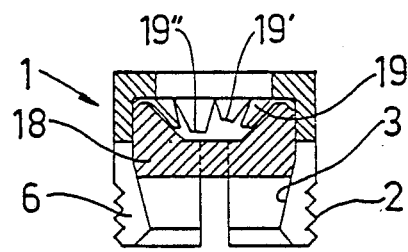
FIGS. 8-11 are sectional views of further embodiments of locking means according to the invention, the locking means of FIGS. 10 and 11 being suitable for use together with the locking means shown in FIGS. 8 and 9.
Figure 9:
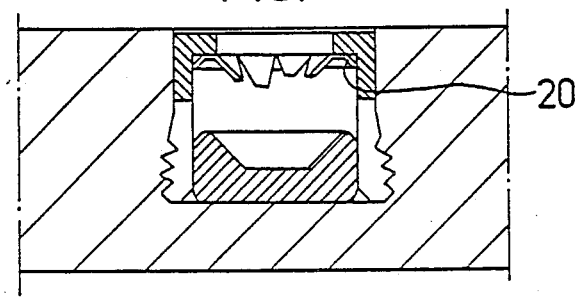
Figure 10:
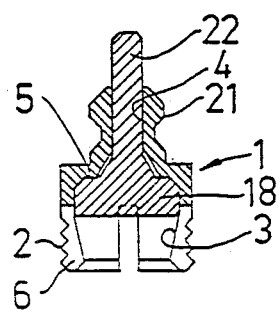
Figure 11:
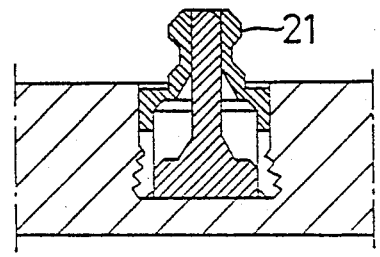

FIG. 8 shows an example of another embodiment of the locking body 1 according to the invention. The opening 4 of the cavity 3 has here been formed substantially wider and a cylindrical element 18 is placed in the wider portion of the cavity. Moreover, a flange is arranged in the form of a separate spring element 19. This can have the form of a spring plate with inwardly directed tonques of for instance slightly different length, continuously from a shortest tongue 19' to a longest tongue 19''. In order to be able to receive the spring element 19 in the starting position the cylindrical element 18 is recessed at the end located most closely to the spring element. As is apparent from FIG. 9 the body 1 is placed in a hole reaching the bottom of a structural element after which the cylindrical element 18 is forced down into the body, thus moving the gripping means 2 apart and pressing gripping means 2 into the material surrounding the hole. This built-in body 1 can for instance consist of the female portion for a male portion shown in FIGS. 10 and 11 which portions may be suitable for example for mounting of furniture. Due to its particular application and in order to safely retain the spring element 19 which engages the material of the body 1 with its folded edge 20 (see FIG. 9) the body is not provided in this case with any other slits starting from the second end of the body. The male portion shown in FIGS. 10 and 11 is basically formed in the same way as previously described but the second end of the body 1 has been provided with a head 21 having a hole. Moreover, the cylindnrical element 18 has been provided with a shank 22 extending through the hole of the head 21 and the end of which extends outside the head 21. Also here the body 1 is placed in a hole reaching the bottom in a building element. Thereafter the cylindrical element 18 is driven downwardly and forces apart the gripping means 2, the shank 22 simultaneously disappearing in the head 21. The procedure will appear clearly from FIG. 11 showing the mounted body. Thus, this male portion can be snapped with the head 21 into the female portion described in connection with FIGS. 8 and 9 and a hidden joint is obtained.

Figure 12:
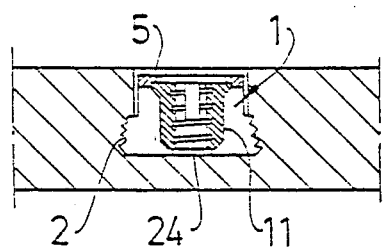
FIG. 12 is a sectional view of yet another embodiment of the invention.

It is shown in FIG. 12 how the central bore of the cylindrical element 11 has been provided with threads 24 with which the threads of a screw are intended to coact, i.e. it is possible in this embodiment to use the locking means directly as the attachment of a screw. The element 11 is preferably formed with ledges for engagement below the flange 5 of the body 1 preventing axial motion of the element 11 in the body. Also in this case the body 1 is lacking the second slits starting from the end provided with a flange. Also in this case the central bore of the element 11 can be made flat, the screw being intended to thread itself through the bore.

It is easily realized by one skilled in the art that the invention can be varied and used in a plurality of different ways within the scope of the invention as is defined in the appended claims.

When using for example the invention in profiles with slits instead of holes the body 1 can of course have a form deviating from a circular section. For example, the gripping means could be arranged in a square configuration.

While this invention has been illustrated and described in accordance with a preferred embodiment, it is recognized that variations and changes may be made and equivalents employed herein without departing from the invention as set forth in the claims.

What is claimed is:

1. A locking apparatus adapted to be anchored in a bore having a cylindrical surface, and to rotatably receive a mating element having an undercut head, the apparatus comprising:
   a substantially cylindrical body having an outer peripheral surface and first and second axial ends;
   gripping means on the peripheral surface adjacent the first axial end for gripping the surface of a bore in which the apparatus is to be anchored;
   a cavity extending coaxially within the cylindrical body and being tapered inwardly from the second axial end of the body toward the first axial end;
   an opening in the first axial end of the body which extends through the first axial end to the cavity;
   at least one axial first slit in the body opening to the first axial end, extending toward the second axial end and being spaced from the second axial end, said first axial slit extending along at least a portion of the body through which said cavity extends, whereby the gripping means is forced outwardly in response to an outward force directed against the tapering cavity or the opening; and
   a flange extending radially inwardly from the second axial end of the body into the cavity to thereby overlie a portion of the cavity, said flange being formed as a separate portion of spring steel and being adapted to retain the undercut head of the mating element thereunder.

2. A locking apparatus adapted to be anchored in a bore having a cylindrnical surface, and to rotatably receive a mating element having an undercut head, the apparatus comprising:
   a substantially cylindrical body having an outer peripheral surface and first and second axial ends;
   gripping means on the peripheral surface adjacent the first axial end for gripping the surface of a bore in which the apparatus is to be anchored, wherein said gripping means consists of peripheral outwardly directed ridges formed with pointed circumferential edges;

a cavity extending coaxially within the cylindrical body and being tapered inwardly from the second axial end of the body toward the first axial end;

an opening in the first axial end of the body which extends through the first axial end to the cavity;

at least one axial first slit in the body opening to the first axial end, extending toward the second axial end and being spaced from the second axial end, said first axial slit extending along at least a portion of the body through which said cavity extends, whereby the gripping means is forced outwardly in response to an outward force directed against the tapering cavity or the opening;

at least one axial second slit in the body opening to the second axial end and spaced from the first axial end;

a flange extending radially inwardly from the second axial end of the body into the cavity to thereby overlie a portion of the cavity; and an undercut portion positioned between the flange and the cavity, said undercut portion being defined by a wall that extends radially inwardly from a point immediately underneath the flange to a point adjacent the cavity, said undercut portion being adapted to seat the undercut head of the mating element and said flange being adapted to retain the undercut head of the mating element thereunder.

3. A locking apparatus according to claim 2, and further comprising radially inwardly directed shoulder that connects said cavity to said opening.

4. A locking apparatus according to claim 2, further comprising a cylindrical slide element having an outside diameter sized to fit within the cavity adjacent the second axial end of the body and to be slidable within the cavity.

5. A locking apparatus according to claim 4, wherein the cylindrical element includes a coaxial bore.

6. A locking apparatus according to claim 2, wherein the body has a plurality of axial first slits opening to the first axial end and spaced from the second axial end of the body.

7. A locking apparatus according to claim 6, wherein the body has a plurality of axial second slits open to the second axial end.

8. A locking apparatus according to claim 2, wherein the flange includes an axially inner edge inclined obliquely inward toward the second end of the body.

9. A locking apparatus according to claim 2, wherein the flange is integral with the body.

10. A locking apparatus adapted to be anchored in a bore having a cylindrical surface, and to rotatably receive a mating element having an undercut head, the apparatus comprising:

a substantially cylidnrical body having an outer peripheral surface and first and second axial ends;

gripping means on the peripheral surface adjacent the first axial end for gripping the surface of a bore in which the apparatus is to be anchored;

a cavity extending coaxially within the cylindrical body and being tapered inwardly from the second axial end of the body toward the first axial end;

an opening in the first axial end of the body which extends through the first axial end to the cavity;

at least one axial first slit in the body opening to the first axial end, extending toward the second axial end and being spaced from the second axial end, said first axial slit extending along at least a portion of the body through which said cavity extends, whereby the gripping means is forced outwardly in response to an outward force directed against the tapering cavity or the opening;

a cylindrical slide element having a coaxial bore and an outside diameter sized to fit within the cavity adjacent the second axial end of the body and to be slidable within the cavity;

at least one axial second slit in the body opening to the second axial end and spaced from the first axial end;

a flange extending radially inwardly from the second axial end of the body into the cavity to thereby overlie a portion of the cavity; and an undercut portion positioned between the flange and the cavity, said undercut portion being defined by a wall that extends radially inwardly from a point immediately underneath the flange to a point adjacent the cavity, said undercut portion being adapted to seat the undercut head of the mating element and said flange being adapted to retain the undercut head of the mating element thereunder.

11. A locking apparatus according to claim 10, wherein the gripping means consists of first and second flanges running peripherally of the body and forming between themselves a recess running around the body.

12. A locking apparatus according to claim 11, wherein the first flange is located next to the first axial end and has an obliquely beveled guide surface connecting the first flange to the first axial end.

13. A locking apparatus according to claim 12, wherein the second flange has a diameter larger than the diameter of the first flange.

* * * * *